US012808700B2

(12) United States Patent
Yamamoto et al.

(10) Patent No.: US 12,808,700 B2
(45) Date of Patent: Nov. 24, 2026

(54) INJECTION-MOLDED ARTICLE AND SENSOR MODULE

(71) Applicant: Sumitomo Wiring Systems, Ltd., Yokkaichi (JP)

(72) Inventors: Hironobu Yamamoto, Yokkaichi (JP); Kyungwoo Kim, Yokkaichi (JP); Toshinari Kobayashi, Yokkaichi (JP); Moriyuki Shimizu, Yokkaichi (JP); Yukitoshi Terasaka, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 366 days.

(21) Appl. No.: 18/580,956

(22) PCT Filed: Jun. 27, 2022

(86) PCT No.: PCT/JP2022/025524

§ 371 (c)(1),
(2) Date: Jan. 19, 2024

(87) PCT Pub. No.: WO2023/002808

PCT Pub. Date: Jan. 26, 2023

(65) Prior Publication Data

US 2024/0353242 A1 Oct. 24, 2024

(30) Foreign Application Priority Data

Jul. 21, 2021 (JP) ................................ 2021-120655

(51) Int. Cl.
*G01D 11/24* (2006.01)
*F16M 13/02* (2006.01)

(52) U.S. Cl.
CPC ........... *G01D 11/245* (2013.01); *F16M 13/02* (2013.01)

(58) Field of Classification Search
CPC . B29C 45/0025; B29C 45/0046; B29C 45/13; B29C 45/22; B29C 45/2616;
(Continued)

(56) References Cited

U.S. PATENT DOCUMENTS 5,556,582 A * 9/1996 Kazmer .................. B29C 45/77 264/328.8
2017/0153265 A1 6/2017 Yamamoto et al.
(Continued)

FOREIGN PATENT DOCUMENTS

JP H6-134828 A 5/1994
JP H6-182798 A 7/1994
WO WO-2019116680 A1 * 6/2019 ............ B01L 3/5027

OTHER PUBLICATIONS

International Search Report, Application No. PCT/JP2022/025524, mailed Sep. 13, 2022. ISA/Japan Patent Office.

*Primary Examiner* — Zachary M Davis
(74) *Attorney, Agent, or Firm* — Brooks Kushman P.C.

(57) ABSTRACT

The injection-molded article is an injection-molded article provided with a first hole and a second hole. The injection-molded article includes a first partially annular portion that surrounds a portion of a circumference of the first hole on a side opposite to the second hole, a second partially annular portion that surrounds a portion of a circumference of the second hole on a side opposite to the first hole, and a coupling portion that surrounds a portion of the circumference of the first hole other than the portion surrounded by the first partially annular portion as well as a portion of the circumference of the second hole other than the portion surrounded by the second partially annular portion, and couples the first partially annular portion and the second partially annular portion. A weld is formed in the coupling portion.

9 Claims, 2 Drawing Sheets

(58) Field of Classification Search
CPC . B29C 45/2708; B29C 45/2735; B29C 45/58; B29C 45/581; B29C 45/2628; B29C 2045/0027; B29C 2045/0039; B29C 2045/0049; B29C 2045/2716; B29C 2045/279; G01D 11/245
USPC .......................................... 425/568, 569, 570
See application file for complete search history.

(56) References Cited

U.S. PATENT DOCUMENTS

2017/0168080 A1* 6/2017 Yamamoto ................ G01P 1/02
2020/0353658 A1* 11/2020 Goshima ............. B29C 45/0025

* cited by examiner

INJECTION-MOLDED ARTICLE AND SENSOR MODULE

CROSS-REFERENCE TO RELATED APPLICATIONS

This application is the U.S. national stage of PCT/JP2022/025524 filed on Jun. 27, 2022, which claims priority of Japanese Patent Application No. JP 2021-120655 filed on Jul. 21, 2021, the contents of which are incorporated herein.

TECHNICAL FIELD

The present disclosure relates to an injection molded article and a sensor module.

BACKGROUND

JP 2017-96828A discloses a fixing member provided with an insertion hole that is a hole passing therethrough in the thickness direction on one side in the longitudinal direction, and a through hole that is a hole passing therethrough in the thickness direction on the other side in the longitudinal direction.

A weld may be formed in an injection molded article due to molten resin streams joining together in a mold. It is desired to reduce the influence of the weld and thus make the injection molded article sturdier.

Therefore, it is an object of the present disclosure to reduce the influence of a weld and thus make an injection molded article sturdier.

SUMMARY

An injection molded article of the present disclosure is an injection molded article provided with a first hole and a second hole, including: a first partially annular portion that surrounds a portion of a circumference of the first hole on a side opposite to the second hole; a second partially annular portion that surrounds a portion of a circumference of the second hole on a side opposite to the first hole; and a coupling portion that surrounds a portion of the circumference of the first hole other than the portion surrounded by the first partially annular portion as well as a portion of the circumference of the second hole other than the portion surrounded by the second partially annular portion, and couples the first partially annular portion and the second partially annular portion, wherein a weld is formed in the coupling portion.

Advantageous Effects

With the present disclosure, it is possible to reduce the influence of a weld and thus make an injection-molded article sturdier.

DETAILED DESCRIPTION OF PREFERRED EMBODIMENTS

Figure 1:
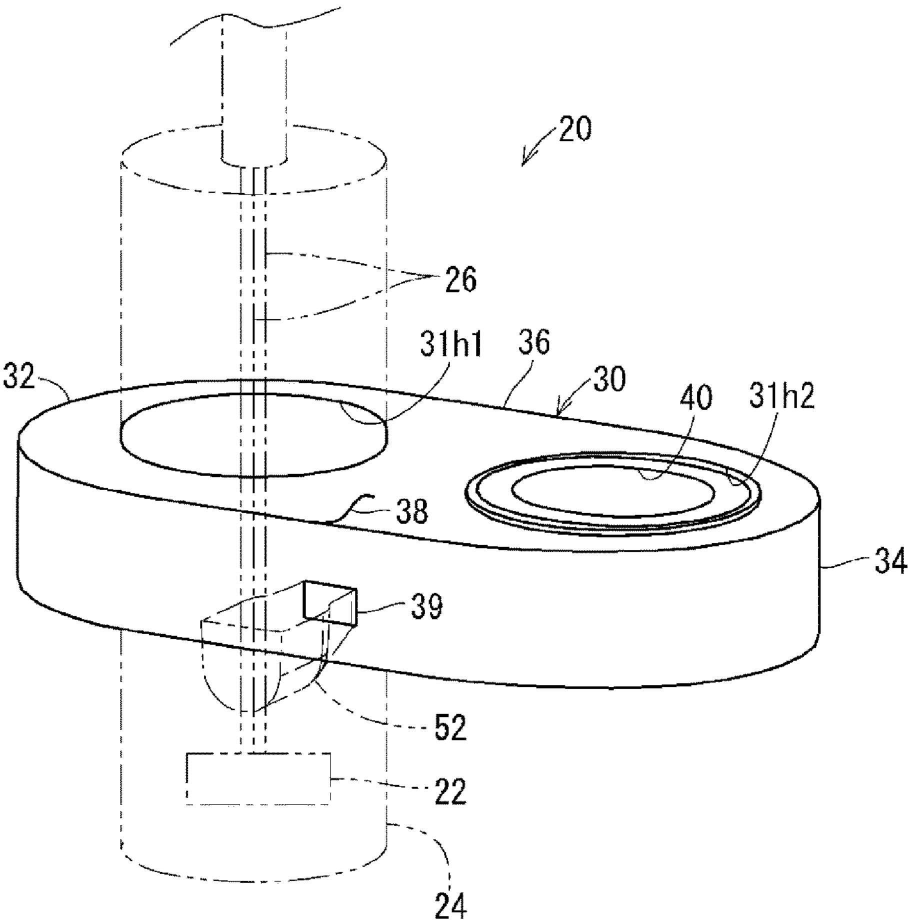
FIG. 1 is a schematic perspective view showing a sensor module according to an embodiment.

First, aspects of the present disclosure will be listed and described.

Aspects of an injection molded article of the present disclosure are as follows.

An injection molded article provided with a first hole and a second hole, including: a first partially annular portion that surrounds a portion of a circumference of the first hole on a side opposite to the second hole; a second partially annular portion that surrounds a portion of a circumference of the second hole on a side opposite to the first hole; and a coupling portion that surrounds a portion of the circumference of the first hole other than the portion surrounded by the first partially annular portion as well as a portion of the circumference of the second hole other than the portion surrounded by the second partially annular portion, and couples the first partially annular portion and the second partially annular portion, wherein a weld is formed in the coupling portion.

With this injection molded article, the portion in which the coupling portion is formed is thicker than the first partially annular portion and the second partially annular portion. The weld is formed in this coupling portion, thus making it possible to reduce the influence of the weld and thus make the injection-molded article sturdier.

The injection molded article according to (1), wherein, as viewed in a direction extending along a central axis of the first hole, the coupling portion has a shape defined by boundaries that are straight lines or lines protruding outward and that connect the first partially annular portion and the second partially annular portion. The weld is formed in this thick coupling portion, thus making it possible to reduce the influence of the weld and thus make the injection molded article sturdier.

The injection molded article according to (1) or (2), wherein a gate trace may be formed on the coupling portion. When a molten resin is poured into the coupling portion through the gate, it is conceivable that, after passing through the coupling portion, the molten resin stream is divided into two streams, one flowing around the first hole and the other flowing around the second hole, and then these two streams flow back to the coupling portion and join together. This makes it easy to form the weld in the coupling portion.

The injection-molded article according to (1) or (2), wherein a first gate trace and a second gate trace may be respectively formed on a portion of the first partially annular portion that is located on a side opposite to the coupling portion and a portion of the second partially annular portion that is located on a side opposite to the coupling portion. In this case, when a molten resin is poured in through the gates at both ends, it is conceivable that the molten resin stream flowing around the first hole and the molten resin stream flowing around the second hole join together in the coupling portion. This makes it easy to form the weld in the coupling portion.

Another aspect of the injection molded article of the present disclosure may be as follows.

An injection molded article provided with a first hole and a second hole, including: a first partially annular portion that surrounds a portion of a circumference of the first hole on a side opposite to the second hole; a second partially annular portion that surrounds a portion of a circumference of the second hole on a side opposite to the first hole; and a coupling portion that surrounds a portion of the circumference of the first hole other than the portion surrounded by the first partially annular portion as well as a portion of the circumference of the second hole other than the portion surrounded by the second partially annular portion, and couples the first partially annular portion and the second partially annular portion, wherein a gate trace is formed on the coupling portion.

In this case, when a molten resin is poured into the coupling portion through the gate, it is conceivable that, after passing through the coupling portion, the molten resin stream is divided into two streams, one flowing around the first hole and the other flowing around the second hole, and then these two streams flow back to the coupling portion and join together. This makes it easy to form the weld in the coupling portion. The portion in which the coupling portion is formed is thicker than the first partially annular portion and the second partially annular portion. The weld is formed in this coupling portion, thus making it possible to reduce the influence of the weld and thus make the injection-molded article sturdier.

Yet another aspect of the injection molded article of the present disclosure may be as follows.

An injection molded article provided with a first hole and a second hole, including: a first partially annular portion that surrounds a portion of a circumference of the first hole on a side opposite to the second hole; a second partially annular portion that surrounds a portion of a circumference of the second hole on a side opposite to the first hole; and a coupling portion that surrounds a portion of the circumference of the first hole other than the portion surrounded by the first partially annular portion as well as a portion of the circumference of the second hole other than the portion surrounded by the second partially annular portion, and couples the first partially annular portion and the second partially annular portion, wherein a first gate trace and a second gate trace are respectively formed on a portion of the first partially annular portion that is located on a side opposite to the coupling portion and a portion of the second partially annular portion that is located on a side opposite to the coupling portion.

In this case, when a molten resin is poured in through the gates at both ends, it is conceivable that the molten resin stream flowing around the first hole and the molten resin stream flowing around the second hole join together in the coupling portion. This makes it easy to form the weld in the coupling portion. The portion in which the coupling portion is formed is thicker than the first partially annular portion and the second partially annular portion. The weld is formed in this coupling portion, thus making it possible to reduce the influence of the weld and thus make the injection-molded article sturdier.

An aspect of a sensor module 20 of the present disclosure is as follows.

A sensor module, including: a sensor; a sensor holder for holding the sensor; the injection molded article according to any one of (1) to (6) in which at least a portion of the sensor holder is disposed inside the first hole; and an electric wire that extends from the sensor through the holder and is drawn out of the holder.

With this sensor module, the injection molded article can be held on the sensor holder by utilizing the first hole of the injection-molded article, and the injection-molded article can be fixed to a fixing target portion through, for example, screwing by utilizing the second hole. Thus, it is possible to make the injection-molded article for holding a sensor sturdier.

The following describes specific embodiments of an injection molded article and a sensor module of the present disclosure with reference to the drawings. Note that the present disclosure is not limited to these embodiments and is defined by the scope of the appended claims, and all changes that fall within the same essential spirit as the scope of the claims are intended to be included therein.

Hereinafter, an injection-molded article and a sensor module according to embodiments will be described. FIG. 1 is a schematic perspective view showing a sensor module 20 that includes an injection molded article 30.

The sensor module 20 includes a sensor 22, a sensor holder 24, electric wires 26, and the injection-molded article 30. The sensor 22 is connected to the end portions of the electric wires 26. The sensor holder 24 covers the sensor 22 and the end portions of the electric wires 26. One end portion of the injection molded article 30 is attached to the sensor holder 24, and the other end portion of the injection-molded article 30 protrudes outward from the sensor holder 24. The sensor holder 24 that holds the sensor 22 is fixed to a fixing target portion via the injection-molded article 30. Thus, the sensor 22 is held in a predetermined orientation at a predetermined position near the fixing target portion. The injection molded article 30 is a bracket for supporting the sensor 22 and the sensor holder 24.

More specifically, the sensor 22 is an element for detecting a physical quantity of magnetism, light, temperature, or the like, or the amount of change thereof. The electric wires 26 are connected to the sensor 22. The electric wires 26 are connected to a terminal of the sensor 22 through soldering, crimping, or the like. The electric wires 26 may be covered by a sheath, or may not be covered by a sheath.

The sensor holder 24 covers the sensor 22 and the end portions of the electric wires 26. The sensor holder 24 has an elongated shape such as a cylindrical shape. The sensor 22 is disposed inside one end portion of the sensor holder 24. The electric wires 26 extends from the sensor 22 located inside the sensor holder 24 through the inside of the sensor holder 24, and is drawn out of the other end surface of the sensor holder 24. The sensor holder 24 is, for example, a resin component formed by performing molding in a mold with the sensor 22 and the electric wires 26 being set as insert portions. The sensor holder 24 may be a complex of a plurality of components. For example, the sensor holder 24 may be a complex of an inner resin holder for holding the sensor 22 and the electric wires 26, and an outer resin component for covering the inner resin holder.

The injection molded article 30 is provided with a first hole **31*h*1 and a second hole 31*h*2. At least a portion of the sensor holder 24 (here, an intermediate portion of the sensor holder 24 in the longitudinal direction) is disposed inside the first hole 31*h*1, and thus the injection molded article 30 is attached to the sensor holder 24. In this state, a portion of the injection molded article 30 provided with the second hole 31*h*2 protrudes outward from the sensor holder 24. The injection-molded article 30 is fixed to a target portion through, for example, screwing by utilizing the second hole 31*h*2**.

The injection-molded article 30 is formed by performing, in a mold, injection molding with the sensor 22 and the sensor holder 24 covering the electric wires 26 being set as insert portions. Accordingly, the first hole **31*h*1 is a hole formed by the sensor holder 24. The second hole 31*h*2 may be formed by the mold surface of the mold or formed by another component disposed in the mold. In this embodiment, an annular metal component 40 is disposed at a portion where the second hole 31*h*2 is to be formed. The annular metal component 40 may be a component called a metal bush. The outer circumferential surface of the annular metal component 40 forms the second hole 31*h*2**.

The sensor module 20 is used, for example, as a sensor for detecting the rotational speed of a wheel of a vehicle. More specifically, the sensor module 20 may be used as a sensor for an ABS (anti-lock braking system).

Figure 2:
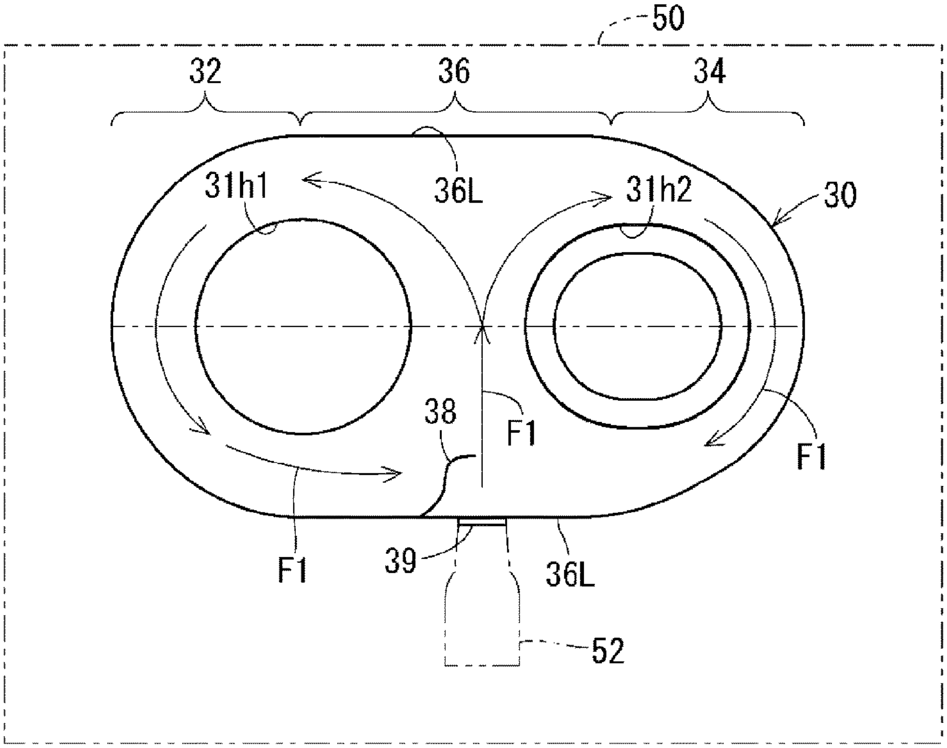
FIG. 2 is a plan view showing an injection-molded article.

FIG. 2 is a plan view showing the injection molded article 30. As shown in FIGS. 1 and 2, the injection molded article 30 has a shape in which two semicircular plate portions are coupled to each other via a rectangular plate portion. The injection-molded article 30 may have an oval plate shape. The injection molded article 30 is provided with the first hole 31*h*1 and the second hole 31*h*2. The first hole 31*h*1 is formed in a portion near one end of the injection molded article 30 in the longitudinal direction, and the second hole 31*h*2 is formed in a portion near the other end of the injection molded article 30 in the longitudinal direction. The first hole 31*h*1 and the second hole 31*h*2 pass through the injection-molded article 30 in the thickness direction. The central axis of the first hole 31*h*1 and the central axis of the second hole 31*h*2 are parallel with each other. The first hole 31*h*1 and the second hole 31*h*2 need not have a circular shape, and may have an elongated shape or a polygonal shape.

The injection molded article 30 includes a first partially annular portion 32 that surrounds a portion of the circumference of the first hole 31*h*1 on a side opposite to the second hole 31*h*2. The first partially annular portion 32 is a portion of the portion surrounding the first hole 31*h*1 that is a semi-annular portion located on one end side of the injection molded article 30 in the longitudinal direction.

The injection molded article 30 includes a second partially annular portion 34 that surrounds a portion of the circumference of the second hole 31*h*2 on a side opposite to the first hole 31*h*1. The second partially annular portion 34 is a portion of the portion surrounding the second hole 31*h*2 that is a semi-annular portion located on the other end side of the injection molded article 30 in the longitudinal direction.

The injection molded article 30 includes a coupling portion 36 that couples the first partially annular portion 32 and the second partially annular portion 34. The coupling portion 36 surrounds a portion of the circumference of the first hole 31*h*1 other than the portion surrounded by the first partially annular portion 32 as well as a portion of the circumference of the second hole 31*h*2 other than the portion surrounded by the second partially annular portion 34. That is to say, the coupling portion 36 surrounds a portion of the circumference of the first hole 31*h*1 on a side near the second hole 31*h*2 as well as a portion of the circumference of the second hole 31*h*2 on a side near the first hole 31*h*1. The coupling portion 36 is formed so as to fill a gap formed when it is assumed that annular portions surround the first hole 31*h*1 and the second hole 31*h*2. More specifically, as viewed in the axial direction of the first hole 31*h*1 or the second hole 31*h*2, the coupling portion 36 has a shape defined by boundaries 36L that are straight lines or lines protruding outward (which may be lines that form a corner protruding outward or a curve protruding outward) and that connect the first partially annular portion 32 and the second partially annular portion 34. For example, the two exterior boundaries 36L of the coupling portion 36 are straight lines, lines protruding outward, or a combination thereof, and connects the widest portion of the first partially annular portion 32 and the widest portion of the second partially annular portion 34. The width of the coupling portion 36 is larger than or equal to the smaller one of the maximum width of the first partially annular portion 32 and the maximum width of the second partially annular portion 34 in the width direction, which is orthogonal to the direction in which the first hole 31*h*1 and the second hole 31*h*2 are lined up.

A weld 38 is formed in the coupling portion 36. A weld refers to a portion formed as a trace of molten resin streams that have joined together in a mold when the injection molded article 30 is formed through injection molding in the mold. The leading end of the molten resin flowing in the mold is cooled and solidified, and it is thus conceivable that a portion where the molten resin streams join together in the mold will be observed as a streak-like discolored portion formed due to the streams of the molten resin that is being cooled and solidified joining together.

In order to form the weld 38 in the coupling portion 36, a configuration is possible in which a mold 50 for molding the injection molded article 30 is provided with a gate 52 at a position where a molten resin is poured into the coupling portion 36 (see FIG. 2). More specifically, a configuration is possible in which the gate 52 is open to a mold space for forming the coupling portion 36 at a position on one side in a direction orthogonal to both the direction in which the first hole 31*h*1 and the second hole 31*h*2 are lined up and the direction in which the central axes of the first hole 31*h*1 and the second hole 31*h*2 extend, and the molten resin is poured in between the first hole 31*h*1 and the second hole 31*h*2 through the gate 52. In this case, it is conceivable that, as indicated by a flow F1, the molten resin flows through the coupling portion 36, flows around the first hole 31*h*1 and the second hole 31*h*2, and then flows into a portion of the coupling portion 36 that is located near the gate 52. Accordingly, it is conceivable that the weld 38 is formed in a portion of the coupling portion 36 that is located near the gate 52.

Note that, after the injection molding, the weld 38 does not always clearly appear, and is hard to observe in some cases. A trace of the gate 52, a gate trace 39, may be formed on the side surface of the coupling portion 36 as a portion of the surface that partially protrudes. However, the gate trace 39 is hard to observe in some cases due to subsequent processing such as cutting or polishing.

Figure 3:
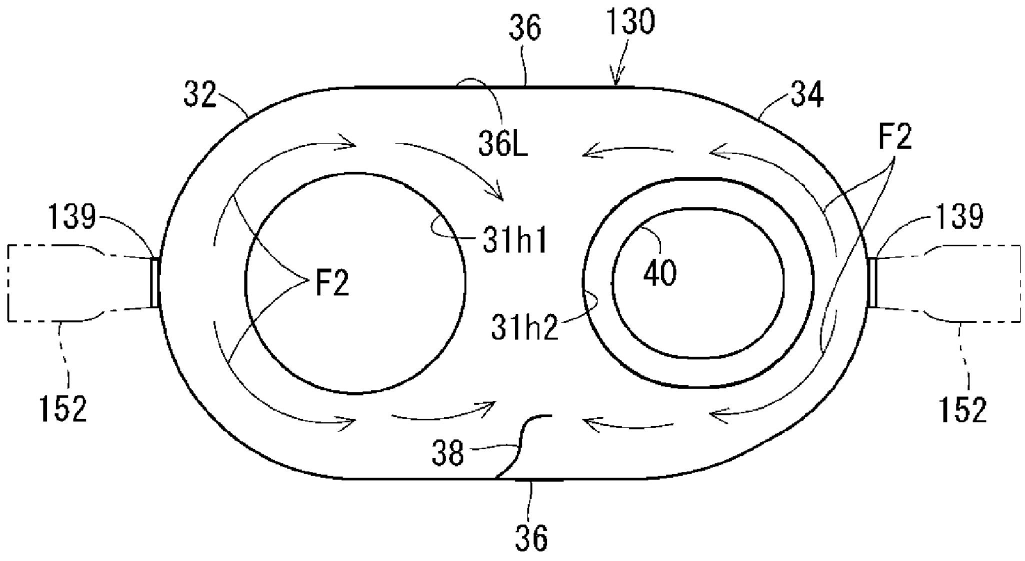
FIG. 3 is a plan view showing another injection molded article.

A configuration is also possible in which, unlike the position of the gate 52 shown in FIGS. 1 and 2, as in an injection-molded article 130 shown in FIG. 3, gates 152 are formed so as to be open to a mold space for forming the first partially annular portion 32 at a position on a side opposite to the coupling portion 36 and open to a mold space for forming the second partially annular portion 34 at a position on a side opposite to the coupling portion 36. In other words, a configuration is possible in which two gates 152 are formed at two ends of the mold space for forming the injection-molded article 30 in the longitudinal direction of the injection molded article 30.

In this case, when a molten resin is poured in through the two gates 52, it is conceivable that, as indicated by a flow F2, each molten resin stream is divided into two streams in the width direction of the injection molded article 30 and flows around the first hole 31*h*1 or the second hole 31*h*2, and then the streams join together in the coupling portion 36. Accordingly, it is conceivable that the weld 38 is formed in the coupling portion 36.

Note that, in this example as well, after the injection molding, the weld 38 does not always clearly appear, and is hard to observe in some cases. Traces of the two gates 152, a first gate trace 139 and a second gate trace 139, may be respectively formed on the surface of a portion of the first partially annular portion 32 that is located on a side opposite to the coupling portion 36 and the surface of a portion of the second partially annular portion 34 that is located on a side opposite to the coupling portion 36, as a portion of the surface that partially protrudes. However, as described above, the gate traces 139 are hard to observe in some cases due to subsequent processing such as cutting or polishing.

With the injection molded article 30 and the sensor module 20 configured as described above, the weld 38 is formed in the coupling portion 36. The portion of the injection molded article 30 in which the coupling portion 36 is formed is thicker than the first partially annular portion 32 and the second partially annular portion 34. Accordingly, even if a portion of the injection molded article 30 in which the weld 38 is formed is weaker than the remainder, the injection molded article 30 is less likely to be broken such that the portion surrounding the first hole 31*h*1 or the portion surrounding the second hole 31*h*2 is divided in the circumferential direction. Accordingly, it is possible to reduce the influence of the weld 38 and thus make the injection molded article 30 sturdier. Thus, it is possible to reduce the rejection rate during the molding of the injection-molded article 30 in a mold.

As viewed in the direction extending along the central axis of the first hole 31*h*1, the coupling portion 36 may have a shape defined by the boundaries 36L that are straight lines or lines protruding outward and that connect the first partially annular portion 32 and the second partially annular portion 34. Such a coupling portion 36 is thicker than the first partially annular portion 32 and the second partially annular portion 34 in the radial direction of the first hole 31*h*1 or the second hole 31*h*2. The weld 38 is formed on this coupling portion 36, thus making it possible to reduce the influence of the weld 38 and thus make the injection-molded article 30 sturdier.

When the gate trace 39 is formed on the coupling portion 36, the injection-molded article 30 is considered as having been formed based on the following aim: after the stream of the resin poured into the coupling portion 36 through the gate 52 passes through the coupling portion 36, the resin stream is divided into two streams, one flowing around the first hole 31*h*1 and the other flowing the second hole 31*h*2, and the two streams flow back to the coupling portion 36 and then join together. In this case, regardless of whether the weld 38 is observed in the injection molded article 30 or is hard to observe, it is possible to make the injection-molded article 30 sturdy.

When the first gate trace 139 and the second gate trace 139 are respectively formed on a portion of the first partially annular portion 32 that is located on a side opposite to the coupling portion 36 and a portion of the second partially annular portion 34 that is located on a side opposite to the coupling portion 36, the injection-molded article 30 is considered as having been formed based on the following aim: the stream of a molten resin poured in through one of the gates 152 is divided into two streams and flows around the first hole 31*h*1, the stream of a molten resin poured in through the other of the gates 152 is divided into two streams and flows around the second hole 31*h*2, and these molten resin streams that have been divided into two streams join together in the coupling portion 36. In this case, regardless of whether the weld 38 is observed in the injection molded article 30 or is hard to observe, it is possible to make the injection molded article 30 sturdy.

With the sensor module 20 that includes the injection-molded article 30, at least a portion of the sensor holder 24 is disposed inside the first hole 31*h*1, and the injection molded article 30 is attached to the sensor holder 24. The first hole 31*h*1 can act to hold the sensor holder 24, and the second hole 31*h*2 can act as a hole for fixing the sensor holder 24 to a target portion through, for example, screwing. As described above, the weld 38 is formed in the coupling portion 36, and therefore, the injection molded article 30 is less likely to be broken such that the portion around the first hole 31*h*1 or the portion around the second hole 31*h*2 is divided. Thus, it is possible to produce the sensor module 20 that includes the sturdy injection-molded article 30 as a fixing component.

MODIFIED EXAMPLE

In the description of the embodiment, the injection molded article 30 is used as a portion of the sensor module 20. The injection molded article 30 is not limited to a component of the sensor module 20, and can be used as various components provided with a first hole and a second hole.

Note that the configurations described in the above-described embodiment and modified example can be used in combination as appropriate as long as they are compatible with each other.

The invention claimed is:

1. An injection-molded article provided with a first hole and a second hole, comprising:
- a first partially annular portion that surrounds a portion of a circumference of the first hole on a side opposite to the second hole;
- a second partially annular portion that surrounds a portion of a circumference of the second hole on a side opposite to the first hole; and
- a coupling portion that surrounds a portion of the circumference of the first hole other than the portion surrounded by the first partially annular portion as well as a portion of the circumference of the second hole other than the portion surrounded by the second partially annular portion, and couples the first partially annular portion and the second partially annular portion,
- wherein the coupling portion has a thickness greater than a thickness of each of the first partially annular portion and the second partially annular portion,
- wherein a weld is formed in the coupling portion.

2. The injection-molded article according to claim 1, wherein, as viewed in a direction extending along a central axis of the first hole, the coupling portion has a shape defined by boundaries that are straight lines or lines protruding outward and that connect the first partially annular portion and the second partially annular portion.

3. The injection-molded article according to claim 2, wherein a gate trace is formed on the coupling portion.

4. The injection-molded article according to claim 2, wherein a first gate trace and a second gate trace are respectively formed on a portion of the first partially annular portion that is located on a side opposite to the coupling portion and a portion of the second partially annular portion that is located on a side opposite to the coupling portion.

5. The injection-molded article according to claim 1, wherein a gate trace is formed on the coupling portion.

6. The injection-molded article according to claim 1, wherein a first gate trace and a second gate trace are respectively formed on a portion of the first partially annular portion that is located on a side opposite to the coupling portion and a portion of the second partially annular portion that is located on a side opposite to the coupling portion.

7. A sensor module, comprising:
- a sensor;
- a sensor holder for holding the sensor;
- the injection-molded article of claim 1 in which at least a portion of the sensor holder is disposed inside the first hole; and an electric wire that extends from the sensor through the holder and is drawn out of the holder.

8. An injection-molded article provided with a first hole and a second hole, comprising:

a first partially annular portion that surrounds a portion of a circumference of the first hole on a side opposite to the second hole;

a second partially annular portion that surrounds a portion of a circumference of the second hole on a side opposite to the first hole; and a coupling portion that surrounds a portion of the circumference of the first hole other than the portion surrounded by the first partially annular portion as well as a portion of the circumference of the second hole other than the portion surrounded by the second partially annular portion, and couples the first partially annular portion and the second partially annular portion, wherein the coupling portion has a thickness greater than a thickness of each of the first partially annular portion and the second partially annular portion, wherein a gate trace is formed on the coupling portion.

9. An injection-molded article provided with a first hole and a second hole, comprising:

a first partially annular portion that surrounds a portion of a circumference of the first hole on a side opposite to the second hole;

a second partially annular portion that surrounds a portion of a circumference of the second hole on a side opposite to the first hole; and a coupling portion that surrounds a portion of the circumference of the first hole other than the portion surrounded by the first partially annular portion as well as a portion of the circumference of the second hole other than the portion surrounded by the second partially annular portion, and couples the first partially annular portion and the second partially annular portion, wherein the coupling portion has a thickness greater than a thickness of each of the first partially annular portion and the second partially annular portion, wherein a first gate trace and a second gate trace are respectively formed on a portion of the first partially annular portion that is located on a side opposite to the coupling portion and a portion of the second partially annular portion that is located on a side opposite to the coupling portion.

* * * * *